(12) United States Patent
Futohashi

(10) Patent No.: US 6,960,713 B2
(45) Date of Patent: Nov. 1, 2005

(54) PORTABLE TELEPHONE

(75) Inventor: Ichiro Futohashi, Hamakita (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/169,860

(22) PCT Filed: Jan. 12, 2001

(86) PCT No.: PCT/JP01/00156

§ 371 (c)(1),
(2), (4) Date: Oct. 21, 2002

(87) PCT Pub. No.: WO01/52506

PCT Pub. Date: Jul. 19, 2001

(65) Prior Publication Data

US 2003/0119443 A1 Jun. 26, 2003

(30) Foreign Application Priority Data

Jan. 14, 2000 (JP) .......................... 2000-007070

(51) Int. Cl.⁷ .............................. G10H 7/00; H04Q 7/20
(52) U.S. Cl. .............................. 84/601; 84/609; 84/618; 84/649; 84/656; 455/422.1; 455/440; 379/67.1; 379/69; 379/142.11
(58) Field of Search .................. 84/600–603, 609–610, 84/615–618, 634, 649–650, 653–656; 455/422.1–440; 379/67.1–87, 142.1, 142.11, 908

(56) References Cited

U.S. PATENT DOCUMENTS

| 5,486,645 A | | 1/1996 | Suh |
| 5,508,978 A | * | 4/1996 | Kalbermatter et al. . 379/110.01 |
| 6,407,325 B2 | * | 6/2002 | Yi et al. ....................... 84/610 |
| 6,606,506 B1 | * | 8/2003 | Jones .......................... 455/566 |

FOREIGN PATENT DOCUMENTS

| CN | 1101477 A | 6/1994 |
| JP | 09-307606 | 11/1997 |
| JP | 10-042008 | 2/1998 |
| JP | 10-150505 | 6/1998 |

* cited by examiner

Primary Examiner—Marlon Fletcher
(74) Attorney, Agent, or Firm—Pillsbury Winthrop LLP

(57) ABSTRACT

A portable telephone produces either beep sound or melody sound as incoming call sound. The melody sound is produced based on music data, which are stored in advance or downloaded from the prescribed distribution center, wherein the music data represent the melody of a single musical tune in different arrangements that are respectively assigned to time zones in advance. Hence, the portable telephone produces the same melody in different arrangements in response to time zones, to which the time for receiving an incoming call belong.

3 Claims, 4 Drawing Sheets

PORTABLE TELEPHONE

This application is the National Phase of International Application PCT/JP01/0156 filed 12 Jan. 2001 which designated the U.S. and that International Application was published under PCT Article 21(2) in English.

TECHNICAL FIELD

This invention relates to portable telephones that produce melody sound to notify users or subscribers of reception of incoming calls from calling parties.

BACKGROUND ART

Conventionally, there are provided analog cellular systems and digital cellular systems, examples of which are known as personal digital cellular telecommunication systems (PDC) and personal handyphone systems (PHS). Upon reception of incoming calls from calling parties, portable telephones produce prescribed incoming call sounds to notify users or subscribers of reception of incoming calls. As incoming call sounds, portable telephones conventionally produce beep sounds, which may be offensive to ears of users. Recently, portable telephones produce melody sounds as incoming call sounds, which are substituted for conventional beep sounds.

However, melody sounds produced by portable telephones are monotonous because melody sounds may correspond to simple musical tones of prescribed musical tunes that are constant in tonality and have poor variations and poor expressions. That is, conventional portable telephones are disadvantageous in that users easily loose interests in hearing monotonous melody sounds for use in notification of reception of incoming calls.

This invention is made in consideration of the aforementioned circumstances, so it is an object of the invention to provide a portable telephone that is capable of producing incoming call melody sound having rich variations and rich expressions.

DISCLOSURE OF INVENTION

A portable telephone of this invention is designed to produce either beep sound or melody sound as incoming call sound to notify the user of reception of an incoming call. The melody sound is produced based on music data, which are stored in advance or downloaded from the prescribed distribution center, wherein the music data represent a melody of a single musical tune accompanied with different arrangements that are assigned to time zones in advance. Hence, the portable telephone produces the same melody by different arrangements in response to time zones to which times for receiving incoming calls belong respectively.

In order to download music data from the distribution center, the user dials its telephone number to establish a call connection. Then, the distribution center provides the user with musical tune selection guidance, contents of which are displayed on the screen of a display of the portable telephone. The user selects a musical tune from among all titles of musical tunes that are listed in the distribution center. Then, the music data of the selected musical tune is downloaded to and stored in the portable telephone. Thus, the user is able to use a new melody of the downloaded music data as new incoming call sound.

Due to variety and rich expressions of incoming call melody sounds that can be produced in different arrangements, the user would not loose interests in hearing incoming call melody sound of the portable telephone. In addition, the user is able to roughly acknowledge the present time for receiving an incoming call by the incoming call melody sound that is produced in the prescribed arrangement in relation to the prescribed time zone. Further, the user does not mistake ringing of his/her own portable telephone for another person's portable telephone because the portable telephone produces the same melody sound whose arrangement is automatically changed in relation to time zones.

BEST MODE FOR CARRYING OUT THE INVENTION

This invention will be described in further detail by way of examples with reference to the accompanying drawings.

Figure 1:
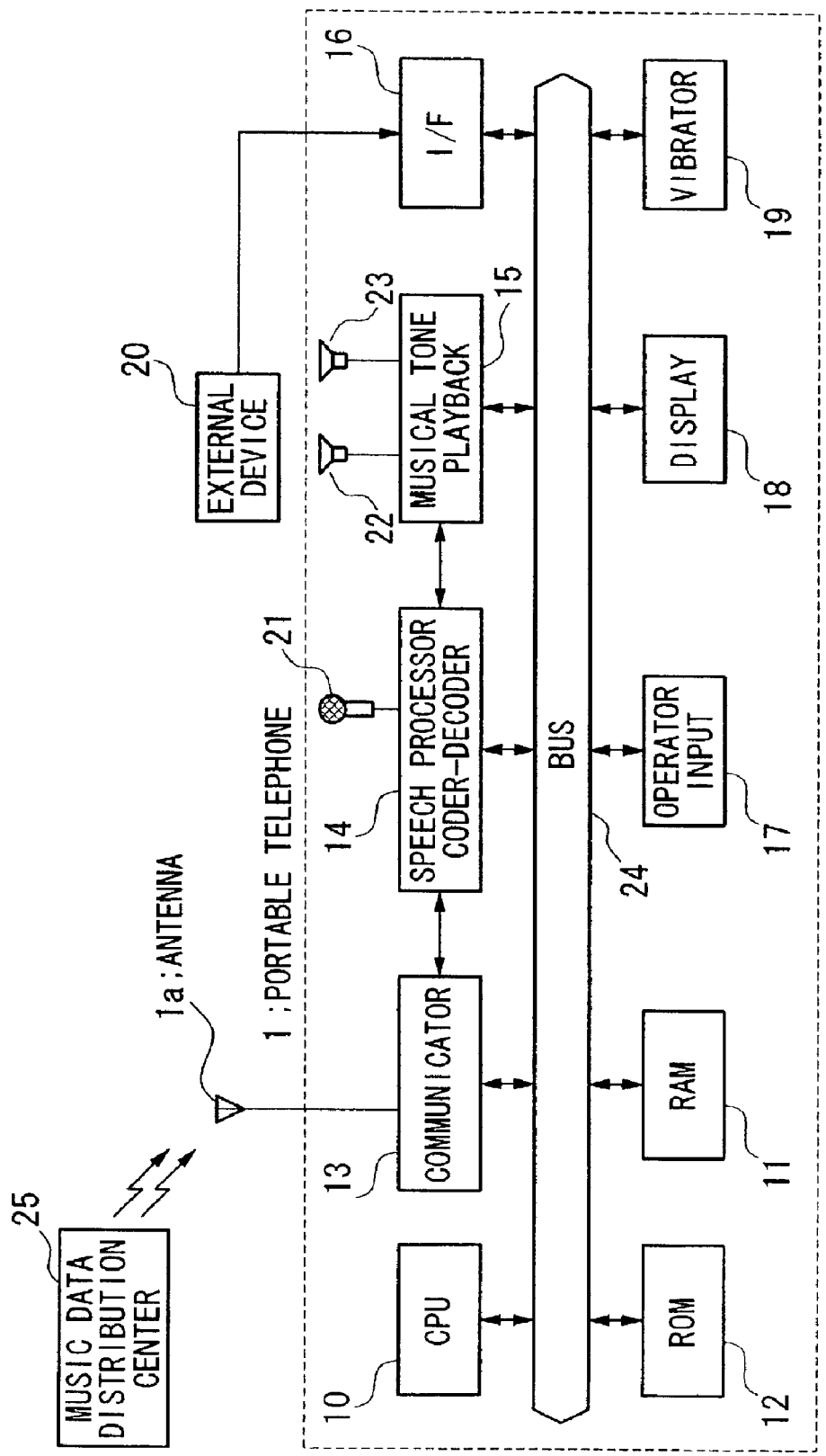
FIG. 1 is a block diagram showing an electronic configuration of a portable telephone in accordance with a preferred embodiment of the invention.

FIG. 1 shows the electronic configuration of a portable telephone 1 in accordance with the preferred embodiment of the invention. The portable telephone 1 generally has a "retractable" antenna 1a, which is connected with a communicator 13 having modulation and demodulation functions. A central processing unit (CPU) 10 having timer functions runs telephone function programs to perform overall controls on several sections and components of the portable telephone 1. A random-access memory (RAM) 11 is a semiconductor memory used for storing data. A read-only memory (ROM) 12 stores programs executed by the CPU 10. In addition, the ROM 12 also stores in advance a variety of music data that represent incoming call sound, hold sound, and background music (BGM) sound, for example.

As the music data representing the incoming call sound, there are provided melody sounds of prescribed musical tunes, as follows:

| Title | Arrangement | Time Zone |
|---|---|---|
| (1) Dango Three Brothers | March | 6:00–10:00 |
| (2) Dango Three Brothers | Rock | 10:00–14:00 |
| (3) Dango Three Brothers | Jazz | 14:00–20:00 |
| (4) Dango Three Brothers | Ballade | 20:00–6:00 |

In the above, there are provided four variations of arrangements on a single tune named "Dango Three Brothers", namely, march, rock, jazz, and ballade, which are respectively assigned to four time zones.

That is, the ROM 12 stores in advance four types of music data that are created based on the same melody of the prescribed single tune and that differ from each other in arrangements. The ROM 12 stores four types of music data together with four time zone data. Incidentally, it is possible to modify the present embodiment such that the RAM 11 is used as a storage for storing music data.

The communicator 13 demodulates incoming call signals received by the antenna 1a, or the communicator 13 modulates transmitting call signals to be transmitted via the antenna 1a. The incoming call signals demodulated by the communicator 13 are decoded by a speech processor 14 having a coder-decoder. That is, the speech processor 14 performs decoding on incoming call signals from a calling party to produce speech signals, which are forwarded to a speaker 22 by way of a musical tone playback section 15. Thus, the speaker 22 reproduces the speech of the calling party based on speech signals. In addition, a microphone 21 converts the speech of the user (namely, called party) to speech signals for transmission, which are forwarded to the speech processor 14. The speech processor 14 performs compressive coding on speech signals to produce compressed speech signals, which are forwarded to the communicator 13 and are transmitted to the calling party via the antenna 1a. As described above, the speech processor 14 has high-efficiency compressive coding and decoding functions on speech signals. Therefore, the speech processor 14 provides a coder-decoder based on the code excited linear predictive coding system (namely, CELPC) or adaptive differential pulse-code modulation system (namely, ADPCM), for example. The musical tone playback section 15 proceeds to formation of incoming call sound, hold sound, and BGM sound, details of which will be described later.

An interface (I/F) 16 is used to download music data from an external device 20 such as a personal computer. An input operator section 17, which is used for entry of telephone numbers and commands, is constituted by numeric keys for inputting numeric values ranging from '0' to '9', function keys, and a jog dial, which are arranged on the panel face of the portable telephone 1. A display 18 is used to display menus for telephone functions as well as characters and/or images in response to manual operations on the operator input section 17. The portable telephone 1 also has a vibrator 19 for generating vibration, which is substituted for incoming call sound, to notify the user of reception of an incoming call. All blocks or sections of the portable telephone 1 are interconnected together by way of a bus 24 to enable transfer of data and instructions.

Figure 2:
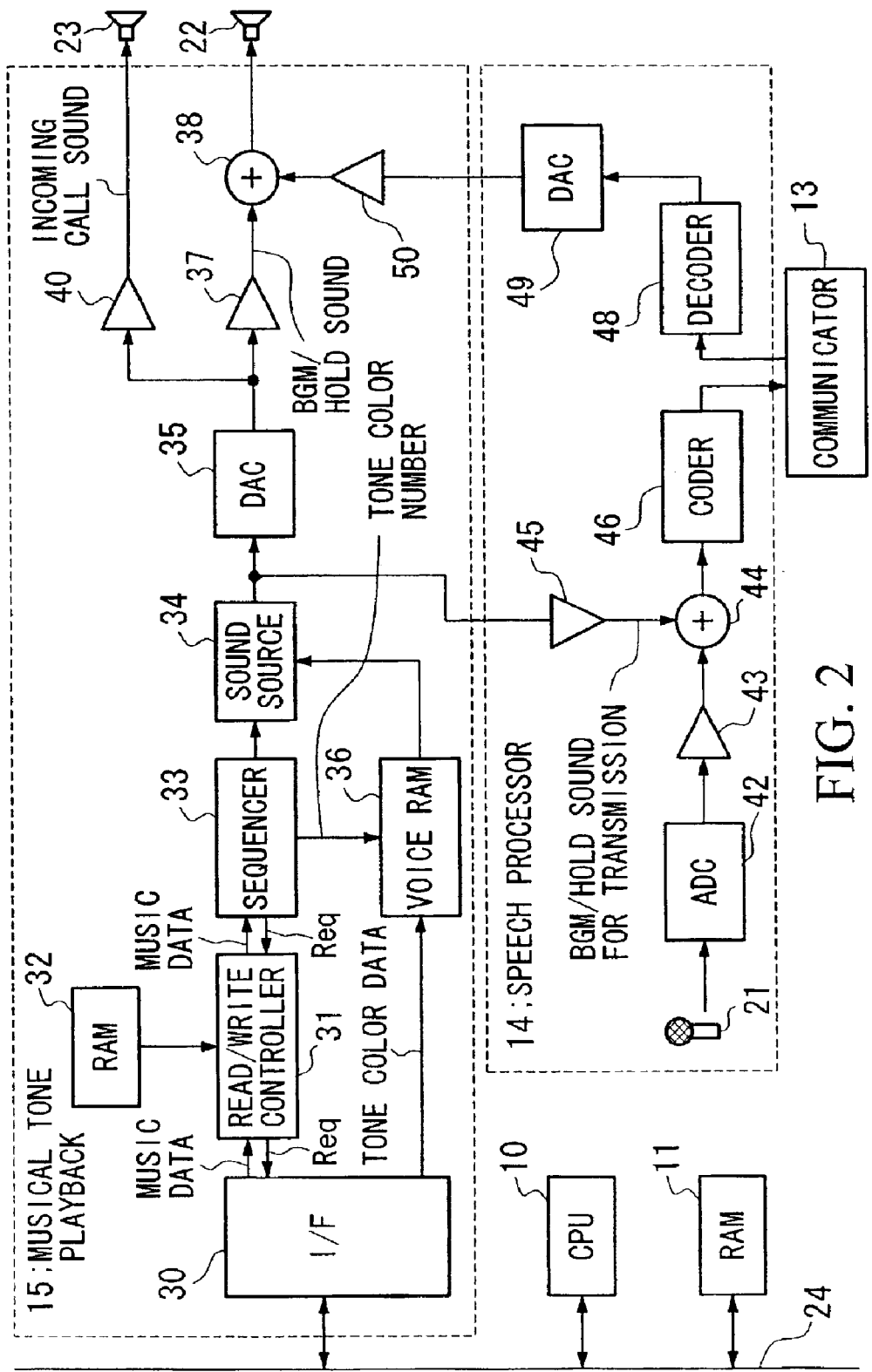
FIG. 2 is a block diagram showing internal configurations of a musical tone playback section and a speech processor shown in FIG. 1.

Next, descriptions will be given with respect to the internal configurations of the musical tone playback section 15 and speech processor 14 with reference to FIG. 2. First, a description will be given with respect to details of the musical tone playback section 15. In the musical tone playback section 15 shown in FIG. 2, reference numeral 30 designates an interface that is used to send and receive various data in connection with the bus 24. A RAM 32 is a semiconductor memory that stores music data except tone color data. A voice RAM 36 is exclusively used to store tone color data within music data. The voice RAM 36 has a prescribed storage capacity for storing multiple tone color data of eight tone colors, for example.

A read/write (R/W) controller 31 reads music data, which the CPU 10 outputs onto the bus line 24, by the interface 30. Then, the read/write controller 31 writes the music data to a RAM 32. In addition, the read/write controller 31 reads from the RAM 32 the music data, which are then forwarded to a sequencer 33.

The sequencer 33 accesses the voice RAM 36 by an address corresponding to a tone color number, which is assigned in advance to a prescribed part within plural parts of the music data. Using such an address, the sequencer 33 reads from the voice RAM 36 prescribed tone color parameters, which are sent to a sound source 34. When starting the playback of a musical tune corresponding to the music data, the read/write controller 31 sequentially reads the music data from the RAM 32 in response to a read request signal Req given from the sequencer 33, so that the read music data are supplied to the sequencer 33. Herein, the RAM 32 has a prescribed storage capacity that is smaller than the storage capacity for completely storing all music data of a single musical tune. For example, the RAM 32 has the storage capacity of storing music data of thirty-two words. The sequencer 33 receives the music data that are sequentially supplied thereto from the read/write controller 31, wherein the sequencer 33 translates the music data to produce various kinds of tone-generation parameters for controlling the sound source 34 to generate musical tones at designated tone-generation timings. The tone-generation parameters are forwarded to the sound source 34. As the tone-generation parameters, there are provided pitch data, note-on/off signals, etc.

The sound source 34 is capable of simultaneously generating musical tone signals of four parts, for example. Herein, tone colors corresponding to four parts are set by the aforementioned tone color parameters that are read from the voice RAM 36. In accordance with the tone colors, the sound source 34 generates digital musical tone signals of four parts respectively based on the tone-generation parameters that are set by the sequencer 33. That is, the sound source 34 generates musical tone data of four parts, which are forwarded to a digital-to-analog converter (DAC) 35 at each prescribed playback timing, wherein the musical tone data are converted to analog musical tone signals.

If the readout of the music data from the RAM 32 progresses so that a prescribed size of a vacant area emerges in the RAM 32, the read/write controller 31 generates a transfer request signal Req, which is sent to the bus 24 by way of the interface 30. The CPU 10 receives such a transfer request signal Req to access the ROM 12 or RAM 11. That is, upon receipt of the transfer request signal Req, the CPU 10 reads from the ROM 12 or RAM 11 sixteen words of music data that match the vacant area created in the RAM 32, for example. The music data of sixteen words are send onto the bus 24. Thus, the read/write controller 31 receives the music data of sixteen words by way of the interface 30. Under the control of the read/write controller 31, the music data of sixteen words are written to the vacant area of the RAM 32. The aforementioned operations are repeated under the control of the read/write controller 31. Hence, even though the RAM 32 has the prescribed storage capacity that is smaller than the storage area for completely storing all music data of a single musical tune, the portable telephone 1 is capable of playing back the musical tune entirely.

In order to produce incoming call sound corresponding to musical tones of the reproduced musical tone signals described above, a coefficient of a coefficient multiplier 40 is set to '1'. Thus, musical tone signals output from the digital-to-analog converter 35 are delivered to a speaker 23, which in turn produces musical tones as incoming call sound. In order to produce musical tones of musical tone signals as BGM sound, a coefficient of a coefficient multiplier 37 is set to '0.5'. In addition, a coefficient of a coefficient multiplier 50, which receives speech signals output from the speech processor 14, is set to '0.5'. A mixer 38 mixes together the musical tone signals and the speech signals by the equal rate to generate mixed signals, which are forwarded to a speaker 22. Based on the mixed signals, the speaker 22 reproduces the speech accompanied with the BGM sound. Herein, the speaker 22 is used for an earphone section of the portable telephone 1, and the coefficient multiplier 50 outputs received speech signals that are decoded by the speech processor 14. In addition, musical tone signals output from the sound source 34 are also delivered to the speech processor 14 as transmitting BGM signals.

In order to produce musical tones of musical tone signals as hold sound that is used for the notification of the hold condition of the portable telephone 1, a coefficient of the coefficient multiplier 37 is set to '1', so that musical tone signals are delivered to the speaker 22 by way of the mixer 38. Hence, the speaker 22 corresponding to the earphone section of the portable telephone 1 produces the hold sound corresponding to musical tones reproduced based on music data. In that case, a coefficient of the coefficient multiplier 50 is set to '0', so that the received speech signals that are decoded by the speech processor 14 are not supplied to the mixer 38 and the speaker 22. In addition, musical tone signals output from the sound source 34 are also delivered to the speech processor 14 as transmitting hold sound signals. In order to inhibit the speaker 22 from producing the hold sound, a coefficient of the coefficient multiplier 37 is set to '0'.

The microphone 21 converts the speech of the user of the portable telephone 1 to speech signals used for transmission. The transmitting speech signals are forwarded to the speech processor 14 shown in FIG. 2, wherein they are converted to digital speech signals by an analog-to-digital converter (ADC) 42. The digital speech signals are forwarded to a mixer 44 by way of a coefficient multiplier 43. The mixer 44 receives from the musical tone playback section 15 the musical tone signals by way of a coefficient multiplier 45. Thus, the mixer 44 mixes the digital speech signals and the musical tone signals together to form mixed signals, which are forwarded to a coder 46. The coder 46 performs high-efficiency compressive coding on the mixed signals based on the code excited linear predictive coding system (namely, CELPC), for example. That is, the coder 46 produces compressed transmission data based on the mixed signals output from the mixer 44. The compressed transmission data are forwarded to the communicator 13, from which they are transmitted to the telephone terminal that is presently communicating with the portable telephone 1 via the antenna 1a. The communicator 13 receives signals from the telephone terminal via the antenna 1a and demodulates them to received speech signals, which are forwarded to a decoder 48 based on the CELPC system. The decoder 48 decodes the received speech signals to produce digital speech signals, which are then converted to analog speech signals by a digital-to-analog converter (DAC) 49. The analog speech signals output from the digital-to-analog converter 49 are supplied to the musical tone playback section 15.

In order to produce musical tones of musical tone signals reproduced by the musical tone playback section 15 as BGM sound that is accompanied with speech, coefficients of the coefficient multipliers 43 and 45 are both set to '0.5'. Hence, the mixer 44 mixes together the speech signals, output from the analog-to-digital converter 42, and the musical tone signals (namely, BGM sound signals) given from the musical tone playback section 15 by the equal rate. Mixed signals are forwarded to the coder 46 and communicator 13 so that they are subjected to transmission to the telephone terminal that is presently communicating with the portable telephone 1 via the antenna 1a.

In order to produce musical tones of musical tone signals reproduced by the musical tone playback section 15 as hold sound, the coefficient of the coefficient multiplier 43 is set to '0' while the coefficient of the coefficient multiplier 45 is set to '1'. Thus, the mixer 44 outputs only the musical tone signals (namely, hold sound signals) supplied from the musical tone playback section 15. The hold sound signals output from the mixer 44 are forwarded to the coder 46 and communicator 13 so that they are subjected to transmission to the telephone terminal that is presently communicating with the portable telephone 1 via the antenna 1a.

Figure 3:
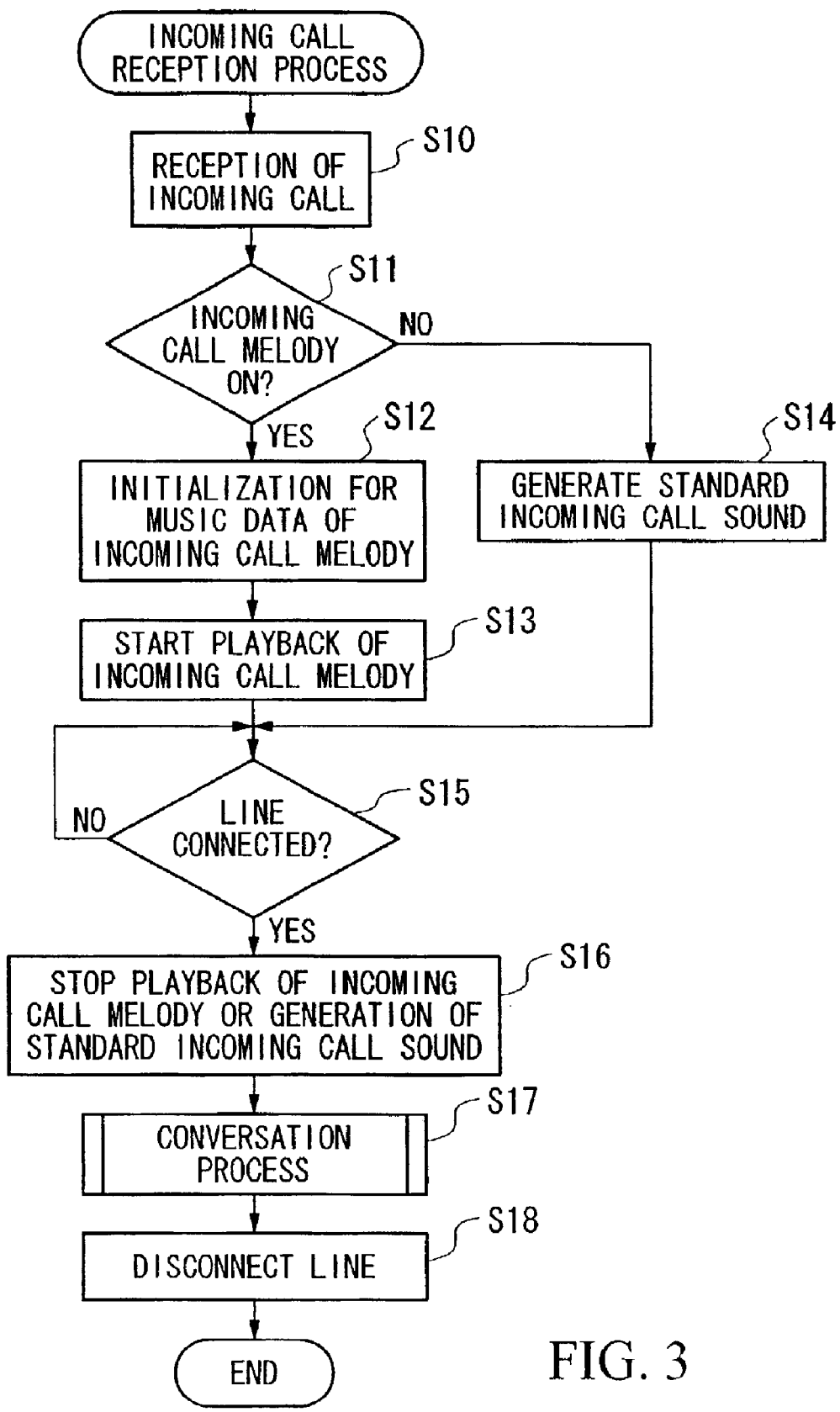
FIG. 3 is a flowchart showing procedures of an incoming call reception process executed by a CPU of the portable telephone.

Next, an incoming call reception process of the portable telephone 1 will be described with reference to FIG. 3. When the portable telephone 1 receives incoming call signals from the telephone terminal of a calling party, the communicator 13 demodulates them to produce incoming call data that contain a calling party telephone number. The incoming call data are forwarded to the CPU 10. Upon receipt of the incoming call data, the CPU 10 executes the incoming call reception process of FIG. 3, wherein the flow proceeds to step S10. In step S10, the CPU 10 performs the prescribed process in which the calling party telephone number is written to the RAM 11 in response to reception of an incoming call from the calling party. In step S11, a decision is made as to whether or not the portable telephone 1 is set in a melody mode for producing melody sound as incoming call sound. When the portable telephone 1 is set in the melody mode, the flow proceeds to step S12 in which the CPU 10 executes initialization on music data used for incoming call melody sound.

In the initialization, the CPU 10 firstly makes detection as to which of the prescribed time zones the present time belongs to. Then, the CPU 10 reads from the ROM 12 or RAM 11 prescribed music data that is designated for the prescribed time zone corresponding to the present time in advance. The music data are sent onto the bus 24. When the present time is 11:15 am, the CPU 10 reads the music data of a second time zone (2), namely, "Dango Three Brothers" in rock arrangement. The music data are sent onto the bus 24. When the present time is 5:20 pm, the CPU 10 reads the music data of a third time zone (3), namely, "Dango Three Brothers" in jazz arrangement. The music data are sent onto the bus 24. The read music data are sent to the musical tone playback section 15, wherein they are written to the RAM 32 shown in FIG. 2. In addition, the voice RAM 36 of the musical tone playback section 15 stores tone color data within the music data. The sequencer 33 translates assignment of tone colors from the music data, so that the sequencer 33 reads from the voice RAM 36 tone color parameters of plural parts, which are forwarded to the sound source 34. In addition, the sequencer 33 reads tempo data from the music data. After completion of the initialization, the flow proceeds to step S13 in which the CPU 10 instructs the musical tone playback section 15 to start playback of musical tones as incoming call melody sound. Thus, the sound source 34 reproduces musical tone signals of plural parts based on tone-generation parameters given from the sequencer 33. Thus, the speaker 23 produces the incoming call melody sound based on musical tone signals of plural parts.

When the CPU 10 determines in step S11 that the portable telephone 1 is not set in the melody mode, the flow proceeds to step S14 in which the sound source 34 proceeds to reproduction of standard incoming call sound such as beep sound, so that the speaker 23 produces standard incoming call sound. In this case, it is possible to substitute standard incoming call sound for vibration, which is to be generated by the vibrator 19. After the CPU 10 completes the step S13 or S14 to produce certain incoming call sound, when the user of the portable telephone 1 presses an incoming call reception button (not shown) on the operator input section 17, the CPU 10 determines in step S15 that a line connection is established with the telephone terminal of the calling party, so that the flow proceeds to step S16. The decision of the step S15 is repeatedly executed until the user presses the incoming call reception button. Until then, the portable telephone 1 continues ringing incoming call sound. In step S16, the CPU 10 stops generating incoming call melody sound or standard incoming call sound by the speaker 23. Concretely speaking, the CPU 10 stops playback operations of the musical tone playback section 15, while the coefficient of the coefficient multiplier 40 is set to '0'.

Next, the flow proceeds to step S17 in which the CPU 10 executes a conversation process in which the user makes conversation over the portable telephone 1. When the conversation is ended, the flow proceeds to step S18 in which the line is disconnected to end the incoming call reception process.

As described above, the portable telephone 1 of the present embodiment is capable of producing the same melody sound in different tonalities and arrangements as incoming call sound in response to time zones for receiving incoming calls. Thus, it is possible to impart variations and expressions to incoming call sounds. In addition, the user is able to roughly acknowledge the present time for receiving an incoming call. Incidentally, it is possible to provide a modification in which the portable telephone can produce melodies of different musical tunes in response to different time zones respectively. However, it is convenient that the same melody of a single musical tune be produced in different arrangements. This is because the user would not mistake ringing of his/her portable telephone for another person's portable telephone when hearing confusing incoming call melody sound.

Figure 4:
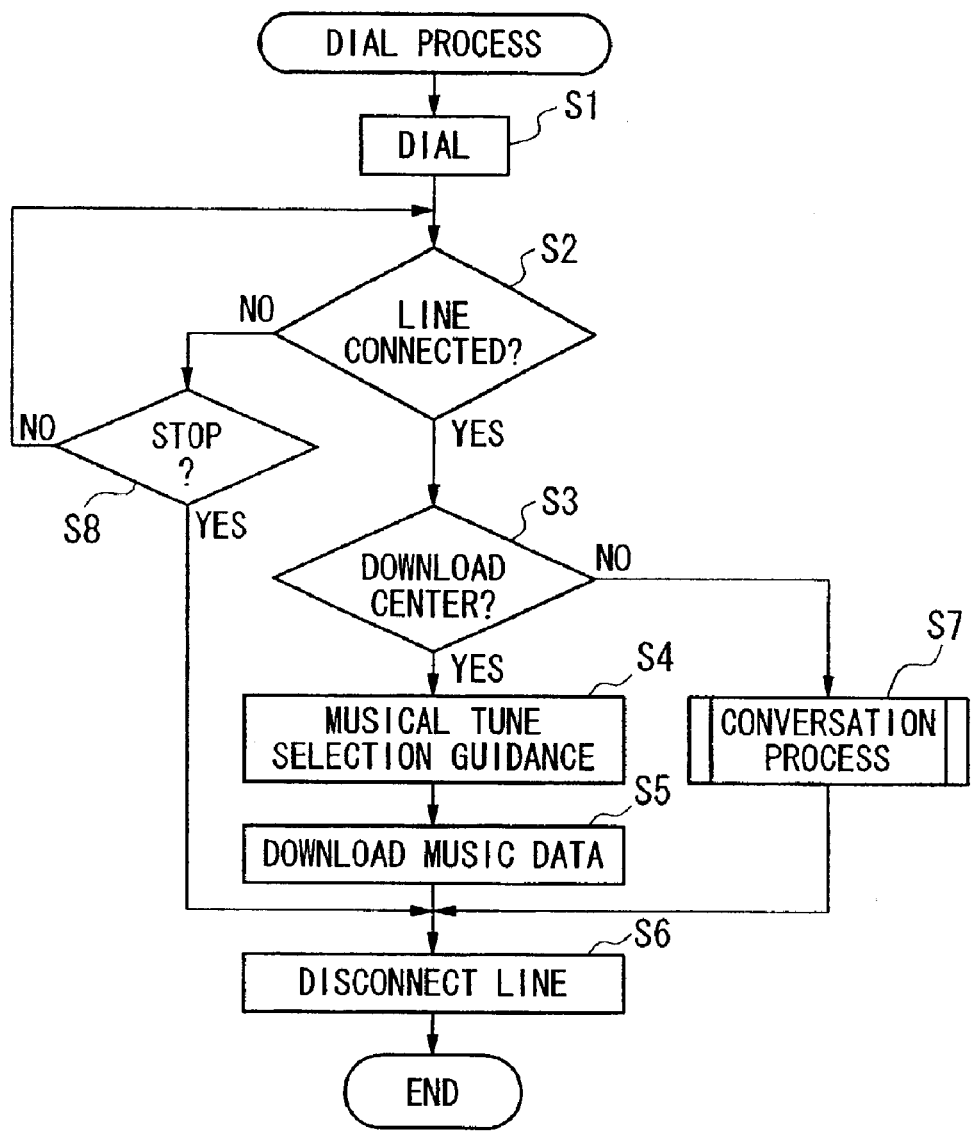
FIG. 4 is a flowchart showing procedures of a dial process executed by the CPU of the portable telephone.

Incoming call melody sounds produced by the portable telephone 1 of the present embodiment are not necessarily limited to the music data that are stored in the ROM 12 in advance. That is, the portable telephone 1 is capable of using other music data, which are distributed from the external music data distribution center, as incoming call melody sounds. Next, a description will be given with respect to a dial process realizing downloading of music data from a music data distribution center 25 with reference to FIG. 4.

First, the user of the portable telephone 1 operates numeric keys of the operator input section 17 to dial a telephone number of a call destination; then, the user presses a call transmission button (not shown) to request a call connection established with the call destination in step S1. Herein, the telephone number of the call destination is stored in the RAM 11 and is combined with telephone number information of the portable telephone 1 by itself to form transmitting call signals. The communicator 13 transmits transmitting call signals to the call destination via the antenna 1a. The transmitting call signals are received by the base station that covers an area including a location of the portable telephone 1 and are relayed to the mobile exchange. The mobile exchange refers to the telephone number of the call destination to set a communication path including the general telephone exchange and base station that are used to establish a call connection with the call destination. Thus, the mobile exchange sends the transmitting call signals onto the communication path. As a result, the call destination (namely, the telephone terminal of a called party) receives incoming call signals corresponding to the transmitting call signals transmitted from the portable telephone 1. In step S2, a decision is made as to whether or not the called party presses a call reception button of the telephone terminal (not shown) to establish an off-hook line to be connected. If the called party does not establish the off-hook line to be connected, the flow proceeds to step S8 in which a decision is made as to whether or not the called party presses a conversation end button (not shown) of the telephone terminal to compulsorily end communication. If the called party does not press the conversation end button of the telephone terminal, the flow proceeds to step S2 to make the aforementioned decision regarding line connection again. That is, the CPU 10 repeats the steps S2 and S8 until the called party establishes a line connection.

When the called party presses the call reception button of the telephone terminal to establish a line connection, the decision result of step S2 is "YES" so that the flow proceeds to step S3. In step S3, a decision is made as to whether or not the called party corresponds to the music data distribution center 25. When the CPU 10 determines in step S3 that the called party corresponds to the music data distribution center 25, the flow proceeds to step S4 in which the CPU 10 receives from the music data distribution center 25 the information data of musical tune selection guidance, contents of which are displayed on the screen of the display 18. The musical tune selection guidance provides the user with singer discriminating lists and genre discriminating lists for classification of musical tunes whose titles and music data are listed in the music data distribution center 25. Using these lists, the user selects from among the 'listed' musical tunes at least a single musical tune to be downloaded. Then, the musical tune selection guidance displays on the screen of the display 18 of the portable telephone 1 a prescribed message, as follows:

"Download request: the complete set of music data or the basic melody of music data?"

In the above message, the complete set of music data provides the user with four arrangements of the same melody of a single musical tune selected, while the basic melody of music data provides the user with only the basic arrangement of the melody of the musical tune.

When the user of the portable telephone 1 selects the complete set of music data, the music data distribution center 25 distributes and downloads the complete set of music data to the portable telephone 1 in step S5. The complete set of music data is received by the communicator 13 and is sent onto the bus 24, by which the music data are sequentially written to the RAM 11 under the control of the CPU 10. Incidentally, the RAM 11 has a storage capacity that is capable of storing multiple sets of music data. After the completion of the distribution and download of the music data, the flow proceeds to step S6 in which the portable telephone 1 disconnects the line connected with the music data distribution center 25. By the way, when the CPU 10 determines in step S3 that the called party does not correspond to the music data distribution center 25, the flow proceeds to step S7 in which the CPU 10 executes a normal conversation process that enables the user to make a conversation with the called party over the phone. When the user ends the conversation, the flow proceeds to step S6 so that the portable telephone 1 disconnects the line connected with the called party. Thereafter, the CPU 10 ends the dial process shown in FIG. 4.

After the completion of the dial process, the user operates certain keys of the operator input section 17 to make the setup such that the downloaded music data stored in the RAM 11 be used for new incoming call melody sound. Then, at reception of an incoming call, the downloaded music data of the RAM 11 are automatically forwarded to the musical tone playback section 15, so that the portable telephone 1 produces new incoming call melody sound based on the downloaded music data.

As described heretofore, this invention has a variety of effects and technical features, which are described below.

(1) At reception of an incoming call, music data are adequately read from the storage in relation to the time zone to which the present time of receiving an incoming call belongs, so that the portable telephone produces adequate incoming call melody sound based on the music data. Herein, the incoming call melody sound is automatically changed over in arrangement in response to time zones. Thus, it is possible to impart variety and expressions in generation of incoming call melody sound. This prevents the user from loosing interest in hearing incoming call melody sound produced by the portable telephone. In addition, the user is able to roughly acknowledge the time zone to which the present time for receiving an incoming call belongs.

(2) The portable telephone is designed to produce the same melody sound in different arrangements in relation to time zones. Compared with the portable telephone that merely produces different melody sounds, the portable telephone of this invention is advantageous in that the user is capable of discriminating incoming call melody sound actually produced by his/her own portable telephone, and the user does not mistake ringing of his/her own portable telephone for another person's portable telephone.

This invention is not necessarily limited to the aforementioned embodiment, hence, it is possible to provide various modifications without departing from the essential subject matter of this invention.

What is claimed is:

1. A portable telephone comprising:
    a line connection establisher for establishing a line connection;
    an incoming call sound generator for generating incoming call sound based on music data;
    a communicator for allowing a user to make communication by the line connection;
    a timer for counting a present time;
    a storage unit for storing in advance a plurality of music data representing a same melody in different arrangements in relation to prescribed time zones respectively; and
    a controller for selectively reading from the storage unit the music data corresponding to the time zone to which the present time belongs, so that the read music data are forwarded to the incoming call sound generator.

2. A portable telephone according to claim 1, further comprising:
    a music data download block to download music data from an external source and store the downloaded music data in the storage unit to enable production of a new melody based on the downloaded music data.

3. The portable telephone according to claim 1, further including a vibration generator to generate vibration upon receipt of an incoming call.

* * * * *